Aug. 20, 1940. F. G. YANES 2,211,806

TONOCHROMATIC SYSTEM AND FILM

Filed July 15, 1937

INVENTOR.

Patented Aug. 20, 1940

2,211,806

UNITED STATES PATENT OFFICE 2,211,806

TONOCHROMATIC SYSTEM AND FILM

Francisco G. Yanes, New York, N. Y., assignor, by direct and mesne assignments, of thirty per cent to Tomas Pacanins, New York, N. Y., and fifteen per cent to Florencio Gomez, Trujillo City, Dominican Republic Application July 15, 1937, Serial No. 153,695

4 Claims. (Cl. 95—2)

In a coapplication Serial No. 153,696, filed on July 15, 1937, another type of tonochromatic material is described which is not sensitive to light. This other material is the polychromatic pad which consists in a support carrying several layers of a medium non-sensitive to light in which several color providing substances are incorporated. Both the tonochromatic film and the polychromatic pad consist of a material having a prearrangement of colors in which the color part image is produced by fixing some of the colors in the film and removing the rest by means of known reactions of the photographic image. The difference between both materials is that in the tonochromatic film the photographic image is produced in the film itself which is light sensitive, while in the polychromatic pad the photographic image is produced in a separate film and then processed and utilized for the elimination of the undesired colors by contact.

The invention here disclosed relates to photographic color reproduction by means of two-element analysis and a synthesis involving only two images which are produced in a special sensitive material having a polychromatic prearrangement. This sensitive material which I may call tonochromatic film is intended for the two-element analysis process of my invention and has no application in three or four color-separation.

The tonochromatic film comprises a support carrying on both sides a plurality of layers in which different color-providing substances are incorporated and so arranged that each side by successive discharges in depth of color-causing matter will show colors belonging to a continuous section of one end of the spectrum, as for instance red, bright red, orange and yellow on one side and bluish green, blue-green, blue and blue-violet on the other side. In the tonochromatic film the order in depth of the colors obtainable by discharge is the same as their spectral position, having the yellow as brightest in one side and preferably its complementary in the other side and, in regard to the support, that order will depend on whether the complemental images are to be produced upwards or downwards.

Several systems have been suggested to produce a graded scale of colors in one image. According to some of these systems the image is first produced and then colored in one or two operations by duo-toning, dye-toning, imbibition and other known methods, so as to give one color to the light tones and another color to the dark ones, the half tones receiving a combined coloring; but whether such effect is produced by inspection and personal intervention of the operator, or whether it is the result of a claimed affinity of certain pigments for certain sections of the image, the results necessarily lack that automatic distribution with which the tones themselves are formed in photography, and that sort of coloring as depending upon a complexity of factors cannot be considered as accurate, proportionate and constant. The matter is still more serious when two opposite images in register should carry two matching graded scales for it is hardly possible to duplicate a complexity of circumstances to produce with different groups of pigments the same effect. Another objection to some of those systems is the dullness produced when pigments are actually mixed, a fact well known in the manufacture of color filters. According to some other systems the graded scale is produced by utilizing the dichroic effect of some dyes or mixtures which transmit different colors in correspondence with their degree of saturation, but outside of the impossibility of obtaining pure, clean, saturated colors at each end of the scale, it is easy to understand that for changing a red into yellow by dilution the resulting scale will be excessively extended and flat to fall within the contrast of a photographic scale of tones.

The tonochromatic film of my invention is purported to obviate the above and other objections in methods of producing graded multicolor scales. Instead of producing the images first and then giving said images an uncertain double coloring with dull mixtures of pigments, the chromatic scale, in a potential form, is preestablished in a combination of colored layers in the positive printing material; said layers, acting as assembled filters combine their absorptions without the necessity of actual pigmentary mixtures, and said color layers are so arranged in position and relative thickness and transmission, that all the colors belonging to one end of the spectrum can be produced by discharging color matter in the same direction that the photographic tones are produced. When ordinary color separation negatives are printed in a positive material carrying the potential chromatic arrangement, on and through the colored layers, as if these were a single layer of emulsion, the different tones will intersect those layers at different depths and properly processed will take or fix the color corresponding to that depth in the scale. And as long as the tonochromatic film can be built to fit negatives of different contrast and two potential chromatic scales can be produced to match each other for opposite records in register, the elements of control and precession in correct double coloring is fully attained.

Before exposing the principle governing the tonochromatic system and the production of the tonochromatic film I wish to be understood that the new method is based upon a hypothesis, because the photographic brilliancy of the primary lights is not an absolute fact and depends upon different circumstances. It is well known that by changing the composition of the illuminant, the sensitivity of the emulsion or the transmission of filters, that photographic brilliancy can be modified and even reversed. From the relative brilliancy of the primary lights naturally depends the relative brilliancy of their mixtures. However, as under standardized conditions the photographic brilliancy of the primary lights may be depended upon, the tonochromatic film can be built accordingly, and both the analysis and the synthesis properly adjusted.

When the photographic brilliancy of a plurality of colors is referred to in the present specification it must be understood as in regard to colors belonging to the same end of the spectrum and under similar conditions. In the example chosen to demonstrate the invention it is assumed that the blue-violet records brighter than the green in order that when equal discharges are produced on both sides of the tonochromatic film two complementary colors will be opposite each other.

Figures 3, 4:
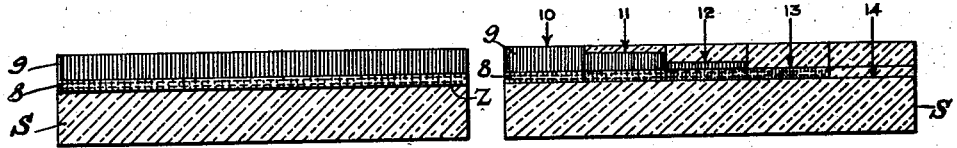
Fig. 3 illustrates a sensitive material comprising a pair of colored strata on a support.

Fig. 4 demonstrates the dichromism of two colored strata.

Figure 5:
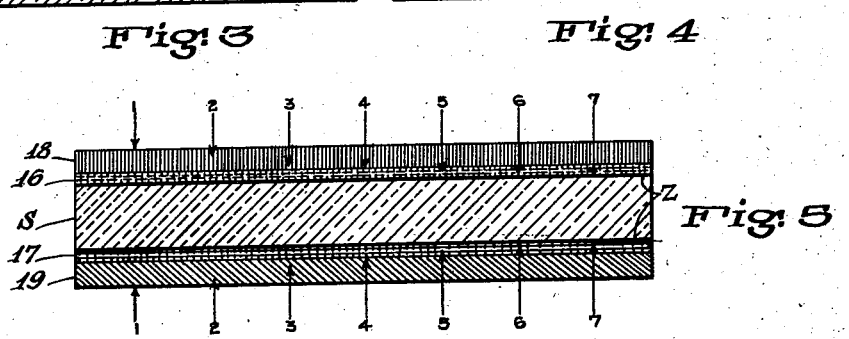

Fig. 5 shows a sensitive double coated tonochromatic film and demonstrates its polychromatism.

Figure 6:
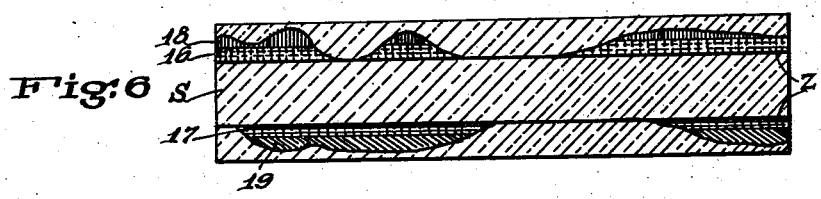

Fig. 6 presents a tonochromatic picture produced upwards.

Figure 7:
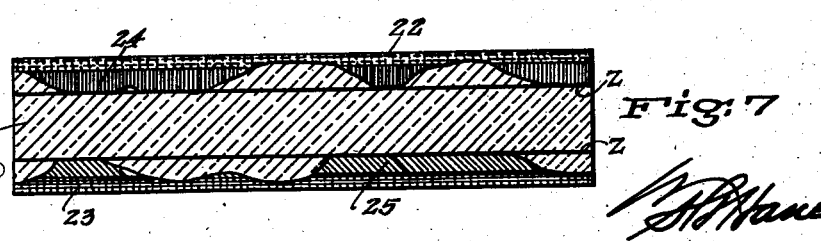

Fig. 7 discloses a tonochromatic picture obtained downwards.

Figure 1:
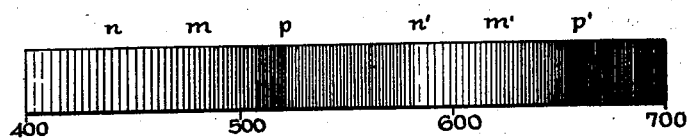
Fig. 1 is a photograph of the spectrum on a panchromatic material.
Figure 2:
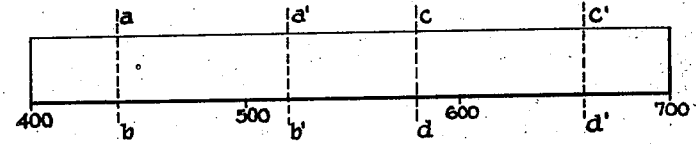
Fig. 2 is a representation of the spectrum in which dotted lines are indicating as example two scales of colors.

When a photograph of the spectrum is taken on a panchromatic material, it appears as in $n$, $m$, $p$ and $n'$, $m'$, $p'$, Fig. 1, and it can be observed that the colors present a different brilliancy for the plate. The same can be noticed when a chart of pigmentary colors are recorded in daylight under an even illumination. By taking this photograph on two plates, respectively separating two scales of complementary colors, as those shown in $a$—$b$, $a'$—$b'$, $c$—$d$, $c'$—$d'$, Fig. 2, for instance, two scales of values are obtained in which similarly ranking tones correspond to the position of the colors at the right and the left of the central green. In these scales the relative brilliancy of the colors of each group nearly correspond to that of their complementary in the other group and, by several adjustments, two scales of values of the same contrast can be obtained.

By examining in our example the scale of colors at the left we will notice that the blue-violet, which is the most brilliant for the plate, is a pure color, and also that the following blues are colors which can be formed by adding green to the above mentioned primary; thus, a certain amount of green will turn the blue-violet into blue; a greater amount into blue-green; and still a larger amount into a bluish green. Thus it appears as if the group were produced by a blue-violet field in which different amounts of green formed a scale of colors for the eye and a scale of tones for the photographic plate.

Giving a similar consideration to the scale of colors at the right we observe that the darkest tone corresponds to the red and that the colors following in brilliancy can be formed by adding green to it; so, a certain amount of green will change the strong into bright red; a greater amount into orange; and still a larger amount into yellow. Thus different amounts of green upon a red field form colors for the eye and tones for the photographic plate, only that in this case the green, instead of appearing as progressively darkening the mixtures with the other extreme primary, looks as if it were increasing their brilliancy for the plate.

When considering the possibility of applying these photographic results to the reproduction of the scales by means of pigments we may describe the green-and-red scale in another way. Instead of a red field in which the addition of different amounts of green produce yellower and brighter colors we can say that in a field where red and green are present—a yellow field—the subtraction of different amounts of green cause redder and darker tones. And as long as the absence of a color is equivalent to the presence of its complementary, the two scales may be considered as formed on two fields, one blue-violet and another yellow, upon which two scales of tones of pigmentary colors, green and magenta, are creating the two complementary groups of colors.

I found that a tonochromatic scale can be obtained by combining two colored strata as illustrated in Fig. 4 where a transparent support S is shown carrying two coatings of a medium: a thin one 8 in which a yellow coloring substance is incorporated and upon this a thicker stratum 9 containing a magenta coloring matter. Such combination is dichrome as it is liable to change in brightness and color through successive modifications. When the pair is examined by transmitted light it shows in 10 a deep red color, but if color is progressively taken from the surface, the pair will transmit in 11 a bright red, in 12 an orange, in 13 yellow and in 14 white. It will thus reproduce all the shades of the scale at the right in Fig. 2 according to the amount of color discharged. If instead of the pair yellow-magenta we use green and blue-violet the colors of the scale on the left in Fig. 2 can also be reproduced proportionally to the color discharged from the combination. So, a pigmentary reproduction of the two scales is possible by discharging the colors in depth; and as a photographic image is formed by different depths of reduced silver, and colors present in a sensitive emulsion as medium can be acted upon by well known different reactions of the image, such discharge in depth can be obtained and the two tonochromatic scales photographically reproduced. The same chromatic effect will result if instead of discharging colors from a pair of strata by means of a negative image, a positive image is produced in a stratified color-forming material and then differently and precisely colored in those parts where the depth of the tones intersect the different strata.

In Fig. 5 is shown a sensitive film including a transparent support S, carrying on each side one of the complementary dichrome pairs, 16—18 yellow-magenta and 17—19 blue-violet-green. To illustrate the formation of colors in the synthesis we shall assume that the arrow penetrating more or less into the strata represents the depths of the tones causing the different discharges. By means of numbers these are indicated and two numbers will describe the combined discharges on both sides, the first number representing the discharge on the upper pair and the second the lower one. Thus 47, which combines the discharge 4 from the upper part and the complete discharge 7 from the lower pair, will represent the yellow while the complementary is represented by the number 14. Several combined discharges are supposed to take place on each side along a line perpendicular to the film and will be demonstrated as examples.

It will be noticed that the color which is discharged is complementary to the color remaining in the film, a result that could be compared with the effect on an absorption band at different sections of the spectrum:

11. Black
22. Dark gray
33. Gray
44. Light gray
55. Pale gray
66. Faint gray
77. White
14. Magenta
41. Green
74. Blue-violet
47. Yellow
27. Red
72. Blue-green
37. Orange
73. Blue
17. Deep-red
71. Bluish-green
24. Reddish-violet
42. Yellowish-green
34. Bluish-violet
43. Greenish-yellow It must be observed that in those combinations beginning or ending with 7 the colors formed are caused by a complete discharge on one side and a partial discharge on the other side and they represent the two scales of the analysis:

71. Bluish-green
72. Blue-green
73. Blue
74. Blue-violet
17. Deep red
27. Red
37. Orange
47. Yellow Although for the analysis adopted as example the proper arrangement is to combine a dichrome-pair magenta and yellow with another pair green and blue-violet, the chromatic order could be reversed or the pairs of colors changed to fit the relative brilliancy of the scales according to variations in the analysis adopted. It would also be possible to use instead of pairs trios of colors as red, orange and yellow; and blue-green, blue and blue-violet, for instance, and even more colors on each side; but it is obvious that such arrangements would be an unnecessary complication as long as the intermediary colors and tones are automatically and proportionally produced by discharging color from the surface towards the support, thanks to the dichromism of two superimposed strata of different thickness carrying two extreme colors.

I may use a positive panchromatic emulsion of the same kind and sensitivity when the colors are actually present in the strata; when colorless color-forming substances are used instead of actual colors an ordinary positive emulsion is sufficient. I may add the color providing substances to the emulsion in two different ways, either by dyeing or impregnating the gelatine before pouring in its solution the mixtures containing the halide and the silver salt, or by dyeing or impregnating the gelatine after the washing; in both cases although the saturation of the color is controllable in the dyeing it may be further modified by addition of plain gelatine. I may also produce the colors in the film after the support is coated with the emulsion, and there are many ways of controlling or modifying the penetration of coloring substances into the colloid, among others by different additions of alcohol; but although this can be done and checked by a trial and error series of tests, it seems that for a commercial manufacture the suitable way is to apply different coatings with the due amount of color-causing matter. I use two solutions of bromide of potassium and nitrate of silver of about fifteen per cent concentration, adding to the first 1 c. c. of hydrochloric acid per liter and about one-quarter per cent of iodide of potassium for the weight of the bromide, and then pouring both solutions into a quarter their volume of a ten per cent solution of gelatine of 50° centigrade. To the mixture I add 1 c. c. of ammonia per liter and after digesting for an hour at about the same temperature, dry gelatine in a weight corresponding to that of the total water used. The emulsion is then set and washed. The formula of course is only an example and others may be used, but whether chosen within the acid or the ammoniacal process, the acidity or alkalinity of the compound must be taken into consideration at the moment the color-causing substances are added as the reactions of these are varied. As to the panchromatization by means of pinacyanol and other sensitizers it is a well known and simple process. However, I must add that when the saturation of the colors is not too great, the recording of the continuous image through the colored layers can be obtained on ordinary material by using sufficient exposure.

Regarding the support I prefer a flexible and transparent one and its nature may change for different kinds of work. For pictures to be examined by reflected light a support of collodion or similar substance is most suitable especially when the elements for the synthesis are to be separately produced and later assembled. In the case of collodion I may counteract its affinity for dyes by a protecting substratum of rubber dissolved in benzol. For transparencies I prefer thin Celluloid when the images are produced in registration on opposite sides of the same support; otherwise other substances may be used of different thickness and their respective pairs of strata assembled in contact. Other supports as a white reflecting opaque or permeable surface can be used for one or both images, which, being a difference in grade, I did not consider necessary to illustrate.

A feature of the material is shown in z, Figs. 3, 5, 6 and 7 and comprises a non-halation-like substratum preferable of a neutral tint although of no particular kind. Its main purpose is to provide a light stopping screen to prevent that the printing light should affect the wrong side. Examples of this substratum may be found in bleachable coatings of hard gelatine carrying a dark pigment as used for many years in some plates on the market. I have found this opaque substratum preferable than mixing in the emulsion a screening soluble color which I may use however in certain adjustments of contrast.

Another point in the arrangement of the color-providing strata is the relative difference of thickness between the strata of each pair. The yellow being a bright color will record nearly as white and naturally it must be a very thin layer. In the figures, for the purpose of demonstration, the thickness of the yellow providing stratum has been exaggerated. I prefer to give this coating a thickness approaching one-fifth of that given the other, which I do by varying the proportion of the gelatine. At the same time as the thinness affects the chromatic effect I increase in equivalent proportion the saturation of the color until when combined with the magenta it produces the proper red. Once the magenta-yellow pair is adopted the other pair must be complementary stratum by stratum and of substantially the same relative thickness.

As to the form of the material it may be produced for later assembling in two separate elements one of which is shown in Fig. 3 where the support S carries a yellow providing stratum 8 and another stratum 9 providing a magenta coloring, the arrangement for the green and blue-violet being identical. But I prefer the arrangement shown in Fig. 5, where the two pairs of colored strata are formed on opposite sides of a common transparent support S carrying color-providing coatings 16, 17, 18, 19. Another variation to fit the method of treatment adopted may be made in the color-providing arrangement in regard to the support. When a method of discharge by means of a negative image is to be practiced the strata are placed as in the tonochromatic picture shown in Fig. 6, the outer strata corresponding to the darker color-providing coatings; and when colors are to be produced by a positive image the color-providing strata are reversed as in the tonochromatic picture illustrated in Fig. 7.

Although I consider the essential part of the invention here described the potential polychromatic prearrangement materialized in the tonochromatic film, to which, by the new technique, the analysis is adjusted and in which the images are produced, I shall mention for the completeness of the description methods of coloring and processing well known in the art and suitable for the sensitive material.

As the colors, when actually incorporated in the emulsion, I prefer the use of direct dyes which as a rule are not affected by ordinary alkaline photographic baths. Diamine derivatives, which are disazo and trisazo compounds are most suitable and also some of the J-acid colors which are azo and disazo mixtures. Other direct colors as those derived from the hydrocarbon stilbene or diphenylethylene are not suitable because although they can be stripped by reducing agents the air reoxidizes them to orange. As to shades and complementary quality, some mixtures may be necessary. As examples of dyes that I use mention can be made of Schultz numbers 279, 326, 385, 474, 616 and many others. Such examples of Schultz numbers may be identified in "Dyes Classified By Intermediates" by Messrs. R. Norris Shreve in collaboration with Warren N. Watson and A. R. Willis, published by the Chemical Catalogue Company, Inc., New York, N. Y., edition of 1922. The saturation depends upon the strength of the viewing light and can be established by test. Such dyes, obviously, are not the only ones which can be used if suitable photographic baths are selected for the processing.

Instead of actual colors I may add to the emulsion colorless substances insoluble in the photographic baths and susceptible of giving a color by a later treatment. As example, some color-developers, as termed in the tinctorial industry, which may supply different colors when coupled with diazotised primuline or other suitable base.

Regarding the processing of the film, although colors and color-formers are diversely affected by different reactions of the photographic image, I have adopted a very simple method based upon the hardening of the gelatine by well known ways. When colors are present in the emulsion I may produce and harden a positive image, dissolve the silver and strip the colors from the field. It is convenient to dissolve the silver before the bleaching for otherwise it may act catalytically and affect the image. I may instead produce negative images, reverse them, harden the reversal images and strip the colors.

When the two elements for the synthesis are separately produced I may print through their respective support, produce positive images, harden them and dissolve the colors with the unhardened colloid. When the support is permeable I may transfer the hardened images and develop them as in carbon tissue processes.

When instead of actual colors I use color-developers in the emulsion I may print negative images, harden them and treat the absorbent section with the coupling bath. In this treatment the colors might but need not be produced by the oxidation products of a photographic developer. The ordinary dyeing operation of coupling the color-developers with a diazotised base is much simpler as practiced in the tinctorial industry and fully described in the respective literature.

Further details regarding the practice of my invention may be found in a coapplication Serial No. 153,696, filed on July 15, 1937, describing a new technique in the production of color pictures and another type of the tonochromatic film which is not sensitive to light. The new technique there described consists in producing the tonochromatic arrangement in a film non-sensitive to light and consisting of a support carrying a medium in which colors are incorporated that by not having a great affinity for the medium can be discharged by contact with a photographic record in which that affinity has been created by known photographic treatments. A simplified form of the tonochromatic film is also there presented in which the combined gradation of colors is only produced in one of the part images and the other part image consists of a monochromatic complementary record.

I am aware that the idea of a prearrangement of colors is not new in general. Whether incorporated in one coating of emulsion as in Deek's Color Sheets or in more layers as in some three color elements connected with other inventions, the practical necessity of laying down a chromatic foundation upon which to build up the color reproduction is old. But no such simple prearrangement as one color to be blocked, or discharged, would solve the double-coloring problem. Whether single or multiple the colored layers in the cited examples are purported to record one image on each layer and to provide one color for said image. But in two-image synthesis, when those images represent not one color but a scale of colors which must be distributed at different tones, the color prearrangement has to be not only multiple but proportional and as long as the shades and tones are so numerous, only a potential, developable arrangement would do. This potential arrangement already demonstrated is shown in Fig. 4. The image produced in depth may be used to cause discharges in depth and the proper colors in the proper tones. Thus the color prearrangement of our invention is potential, multicolor, photographically developable, and according to its theoretical foundation, spectral. Those qualities, I believe, are sufficient to prove its novelty. Yet it must be said that those qualities are not merely new functions found in the use of an old structure as a polycolor prearrangement of strata. They have been actually created by combining different modifications to obtain the new result. Such new features which we shall discuss may be resumed in the following points: 1. The plural color strata have an order in the tonochromatic film, which is the rank of photographic brilliancy among the colors of each group, and such order is essential to produce the colors in the same direction as that of the photographic tones. 2. The emulsion in the different strata needs not a selective color sensitiveness because it is not purported to produce a different color-value image in each of the layers. As long as the separation has already been performed in the negatives of the analysis, the film is a sort of positive material in which two single, continuous images for the synthesis are respectively recorded in register on and through the opposite groups of strata. A difference which, besides its chromatic importance is necessary in the adopted methods of processing in which the hardening of the gelatine is utilized, because separate images would have intermediate sections of hardened colloid bottling the inner records for any penetration of chemical solutions, while in the continuous image the different strata can be easily reached from the surface. 3. The normal number of strata are four, each pair providing the potential prearrangement for a scale of colors and the possibility of opposing to every color the corresponding complementary. 4. The thickness of the strata in each pair of layers is different. And this is not either a difference in grade but still another substantial differentiation which is based upon the theoretical foundation of the system already disclosed, in which the brilliant color provides the field, the dark one the tones, and their combination the scale of colors.

The terms I use in the appended claims to distinguish my invention from the prior art must not be construed to exclude other forms using wholly or partially the tonochromatic prearrangement whether actual or developable for correct reproduction and for precise double-coloring of two-element separation images, whether silver or other salts, gelatine or other organic substances, Celluloid or other materials enter in the formation of the sensitive type of the tonochromatic film. Nor should they be misconstrued as including in my invention the prearrangement of one single color in a single sensitive stratum; or of more than one color in strata of selective sensitivity or different speed purported to produce one image on each stratum. The tonochromatic method and the tonochromatic film are exclusively intended for color reproduction by means of two-element analysis within the simplification of a synthesis involving only two continuous images, which, produced in and through a special stratified material having a potential tonochromatic prearrangement, are respectively transformed into two polychromatic and preferably complementary elements for the synthesis.

I claim:

1. A photographic material having in combination a transparent support and two layers of emulsion of different thickness superposed on each side of said support, each one of the four layers carrying a substance susceptible of providing a different pigment in the respective emulsion, the pigments provided on one side of the support corresponding to magenta for the thicker layer and to yellow for the thinner layer and on the other side of the support to green for the thicker and to blue-violet for the thinner layer.

2. In color photography, the method of producing a positive part image showing a strong color in the heavy tones, a different color of lesser saturation in the lighter tones, and a combined and proportionate gradation of both colors in the middle tones, all of said colors belonging to the same end-half of the spectrum, which consists in first, procuring a material cimbining on the same side of the support two superposed layers of a medium sensitive to light, said layers being of different thickness and respectively carrying a different substance susceptible of furnishing in the thinner layer a pigment corresponding to the color of lesser saturation and in the other layer a pigment which when combined with the other pigment will produce the strong color; second printing on said material the corresponding photographic part image through both layers as if these were forming a single layer, said part image will be positive so that the lighter tones will layer of the material is the outer one such part image will be positive so that the light tones will intersect the thinner layer and the rest of the tones will intersect both the thinner layer and at different depths the thicker layer; third, processing said image by known treatments so that the pigments present in the positive values will be protected from further treatments; fourth, removing by known means the remaining of the image and the pigments outside of those present in the protected positive values; and fifth, washing and drying the multicolor part image.

3. A photographic material having in combination a transparent support and two layers of light sensitive emulsion of different thickness superposed on each side of said support, each one of the four layers forming an individual stratum of definite cross-sectional area and carrying a substance fixed in the corresponding emulsion and susceptible of providing a different pigment in the respective layer; the pigments provided on each side of the support respectively corresponding in one of the layers to a spectral color and in the other layer to a second color which, when combined with the first color in different proportions will reproduce a succession of colors belonging to one end-half of the spectrum for one side and to the other end-half of the spectrum for the other side.

4. A supported photographic color picture having in combination one pair of superposed layers of different thickness and originally containing fixed color providing substances, and another similar pair of superposed layers also having different thickness and also originally containing fixed color providing substances, each one of the four layers forming an individual stratum of definite cross-sectional area and each carrying, fixed therein, a color photographic part picture, the part-pictures provided by each pair of layers respectively corresponding in one of the two layers to a spectral color and in the other layer to a second color which combines with the first color in different proportions to reproduce a succession of colors belonging to one end-half of the spectrum for one pair and to the other end-half of the spectrum for the other pair, the color part-pictures furnished by the first pair of layers combined in register with the colored part-pictures furnished by the second pair of layers in said supported photographic color picture.

F. G. YANES.

CERTIFICATE OF CORRECTION.

Patent No. 2,211,806. August 20, 1940.

FRANCISCO G. YANES.

It is hereby certified that error appears in the printed specification of the above numbered patent requiring correction as follows: Page 5, second column, line 7, claim 2, for "cimbining" read --combining--; lines 19 and 20, same claim, for the words "will be positive so that the lighter nes will" read --of such character that when the thinner--; line 21, same claim 2, for "light" read --lighter--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.